United States Patent [19]

Heinzl

[11] 4,374,388
[45] Feb. 15, 1983

[54] METHOD AND AN ARRANGEMENT FOR DEPICTING A HALF-TONE IMAGE

[75] Inventor: Joachim Heinzl, Munich, Fed. Rep. of Germany

[73] Assignee: Siemens Aktiengesellschaft, Berlin & Munich, Fed. Rep. of Germany

[21] Appl. No.: 195,595

[22] Filed: Oct. 9, 1980

[30] Foreign Application Priority Data

Oct. 24, 1979 [DE] Fed. Rep. of Germany ....... 2943018

[51] Int. Cl.³ .......................... G01D 15/18; H04N 1/40
[52] U.S. Cl. ................................ 346/140 R; 358/283; 346/1.1
[58] Field of Search ...................... 346/1, 75, 140 PD; 358/283, 296, 298

[56] References Cited

U.S. PATENT DOCUMENTS

| | | | |
|---|---|---|---|
| 3,604,846 | 9/1971 | Behane et al. | 346/75 UX |
| 3,977,007 | 8/1976 | Berry et al. | 346/75 X |
| 4,032,978 | 6/1977 | Wong | 358/283 |
| 4,033,443 | 7/1977 | Bung et al. | 197/1 R |
| 4,112,469 | 9/1978 | Paranjpe et al. | 358/296 |
| 4,158,847 | 6/1979 | Heinzl et al. | 346/140 R |

FOREIGN PATENT DOCUMENTS 2008890 6/1979 United Kingdom .

OTHER PUBLICATIONS

Heinzl et al., "Printing Unit" (Excerpt) Siemens-Zeitschrift, 51 (1977), No. 4, pp. 220-221.

Primary Examiner—George H. Miller, Jr.
Attorney, Agent, or Firm—Hill, Van Santen, Steadman, Chiara & Simpson

[57] ABSTRACT

A method and an arrangement for depicting half-tone images of equal-sized image dots provides an arrangement of the image dots in a grid having three directions of orientation at an angle of 60°. Each image dot is thus equidistant from the six directly adjacent image dots. A constant number of adjacent grid positions is always used to form an image patch. The number of image dots in an image patch determines the grey step in question. The filling of the image patches with image dots according to the grey step to be produced always takes place following the same rule. The image dots associated with a particular grey step are equidistant from corresponding image dots in the six directly adjacent image patches.

8 Claims, 8 Drawing Figures

METHOD AND AN ARRANGEMENT FOR DEPICTING A HALF-TONE IMAGE

BACKGROUND OF THE INVENTION

1. Field of the Invention

The present invention relates to a method of depicting a half-tone image in which the half-tone image is formed with grey steps and is generated from equal-sized image dots which are arranged in predetermined grid positions and whose number per unit area determines the grey step in question, and to an arrangement for implementing such method.

2. Description of the Prior Art

When depicting half-tone images using dots of the same size and of the same color, it is conceivable to arrange the image dots in a grid having two lines of orientation, corresponding to the axes of a rectangular coordinate system. In each case, a constant number of grid positions can be used to form an image patch of constant size and shape. The number of image dots in each image patch determines the grey step in question. The image dots can be distributed within the image patches statistically or following a preset pattern corresponding to the grey step to be reproduced When the grid positions are arranged with two lines of orientation, the image dots must be of relatively large diameter to achieve complete cover when all the image dots are being used. Moreover, with such an arrangement of the image dots, there is a danger of moire patterns occurring with certain grey steps.

SUMMARY OF THE INVENTION

Consequently, the object of the present invention is to provide a method of depicting half-tone images in which smaller image dots can be used to achieve the same degree of cover with the same image dot distribution and in which the incidence of moire patterns is largely eliminated.

According to the invention, the above object is achieved with a method of the type generally mentioned above in that the grid positions are defined with three lines of orientation and in that each grid position is surrounded by six directly adjacent grid positions and is equidistant from these grid positions.

The method of the present invention has the advantage that dense packing of the image dots is achieved and that when using the same size of image dot as for a grid with two lines of orientation, considerably better coverage of the area with color is obtained. The arrangement of the image dots gives better image quality. This is manifest, for example, in the fact that a grey wedge produced by the method of the present invention, when viewed at closer range, has a more even effect than a grey wedge having two lines of orientation.

The even distribution of the image dots for the different grey steps and the good image quality are achieved in particular when the image dots associated with a specific grey step are equidistant from corresponding image dots in six directly adjacent image patches.

When a given number of adjacent grid positions are used to form an image patch, particularly good image quality is achieved, particularly when the image patches are always filled in the same manner with a number of image dots corresponding to the grey step in question.

In order to obtain uniform image quality over the entire half-tone image, it is not only necessary to arrange the image dots inside the patches with the three lines of orientation; it has also proved expedient to bring the image patches together in such a way that all the image dots are disposed along the three lines of orientation.

If the image dots are to be used to depict half-tone images with ten grey steps, it is advantageous if nine adjacent grid positions are always used to form an image patch, if the image patches are arranged in lines and if the image patches of adjacent lines are disposed offset by 1.5 image dot divisions.

With a four-step grey wedge, particularly even distribution of the image dots is achieved when three directly adjacent grid positions serve to form an image patch, when the image patches are arranged in columns, and when the image patches of adjacent columns are disposed offset by one line.

One particularly simple image patch structure is obtained when seven directly adjacent grid positions are used to form an image patch.

In order to achieve particularly good outlines with half-tone images, it is advantageous with truncated image patches if the remaining image dots are shown arranged in the same manner as in complete image patches.

The method of the present invention can be implemented advantageously with an arrangement in which there is a printing head which prints onto a recording carrier in lines at right angles to its primary direction of advance, in which the printing head contains a plurality of printing elements which produce the image dots, and in which a plurality of adjacent printing elements always print one image patch.

One particularly advantageous arrangement for implementing the method of the present invention is obtained when the printing head takes the form of an ink printing head whose printing elements are constructed as nozzles which expel ink.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
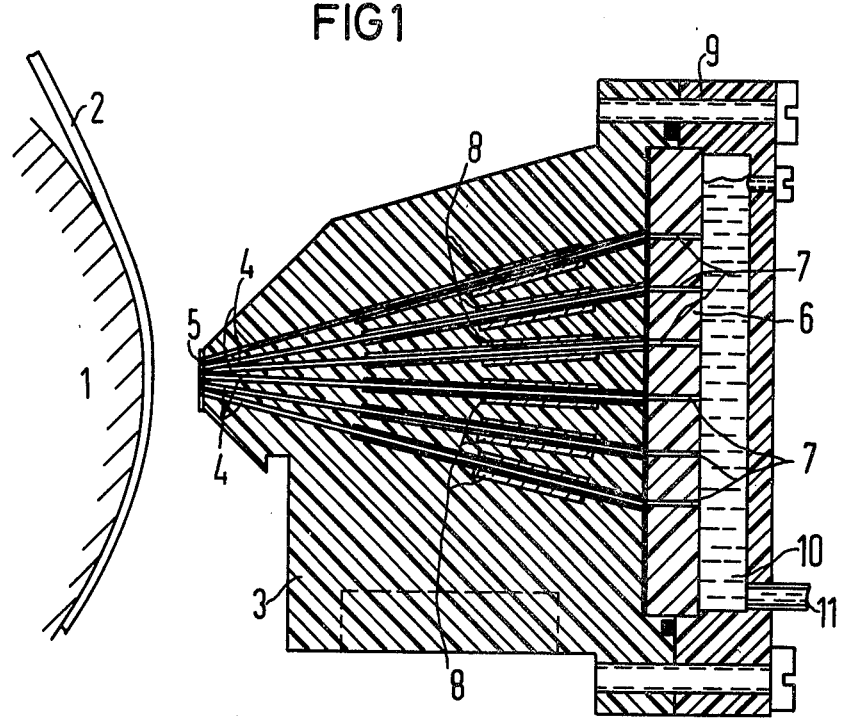
FIG. 1 is a sectional view of an ink printing head for reproducing half-tone images.

The ink printing head illustrated in FIG. 1 is disposed on a carriage of a printing station and moves along a platen 1 in order to print on a recording carrier 2 placed around the platen 1. The ink printing head can print both alphanumeric symbols and graphic designs, such as half-tone images, on the recording carrier 2.

The ink printing head comprises a first plastic part 3 containing a plurality of nozzle ducts 4. By way of example, the ink printing head has twelve nozzle ducts 4 which are disposed in two planes of which only those in one plane are illustrated in FIG. 1. The nozzle ducts 4 radiate outwardly in both planes. On one side they terminate in a nozzle plate 5 having twelve nozzles from which drops of ink pass along parallel paths to the recording carrier 2. At the other ends of the nozzle ducts there is a restrictor plate 6 which has a narrow duct 7 through which the ink is fed to the nozzle ducts 4. The nozzle ducts 4 are concentrically surrounded by piezoceramic transducers 8. When a voltage is applied to one or more of the transducers 8, a shock wave is generated in the associated nozzle duct 4 and droplets of ink are expelled from the corresponding nozzles through the nozzle plate 5. The nozzle ducts 4 are supplied with the ink through a storage chamber 10 provided in a second plastic part 9. The storage chamber 10 is linked with an ink container located behind the printing head by way of a supply line 11.

When producing alphanumeric symbols, the transducers 8 are actuated according to signals emitted by symbol generators disposed in the printing station. When producing graphic designs, such as half-tone images, the transducers 8 are actuated either in similar fashion by signals emitted from a memory in which the graphic designs or half-tone images are stored or by signals transmitted along a transmission path, like in facsimile transmission.

Figure 2:
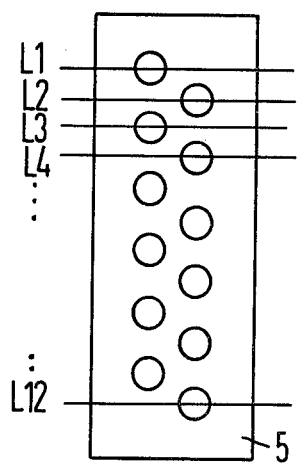
FIG. 2 is a front view of a nozzle plate for an ink printing head.

The nozzle plate 5 of the ink printing head, as illustrated in FIG. 2, has twelve nozzle which are associated with the nozzle ducts 4 arranged in the two planes. These are arranged offset in a manner known per se to achieve close nozzle spacing in the vertical direction.

When producing half-tone images, the images are formed using image dots of constant size. The image dots are disposed on parallel lines L1-L12 each associated with a respective nozzle of the ink printing head. As the ink printing head moves along the platen 1, the image dots are printed on the recording carrier 2 next to one another. After each movement of the ink printing head along the platen 1, the recording carrier 2 is moved on in the main direction of advance at right angles to the direction of printing by an amount corresponding to the lines L1-L12 through a movement of the platen 1. In this manner, a continuous half-tone image is produced on the recording carrier 2.

The grey steps of the half-tone image are produced by the number of image dots printed per unit area. The image dots are grouped in a constantly recurring pattern. This pattern, comprising n image dots, is known as an image patch. A grey step contains a plurality of identical image patches. The image patches of a step all contain the same number of image dots. The zero step is white and contains zero dots per image patch. The $n^{th}$ step contains the maximum possible number of n image dots per image patch and therefore exhibits the maximum possible coverage of the area with image dots. The distribution of the image dots according to the grey steps to be produced is selected so that it is as uniform as possible firstly within the image patches and secondly in association with the neighboring image patches so that the formation of moire patterns is largely avoided. Advantageously, the image dots are arranged in all the image patches following the same pattern.

Figure 3A:
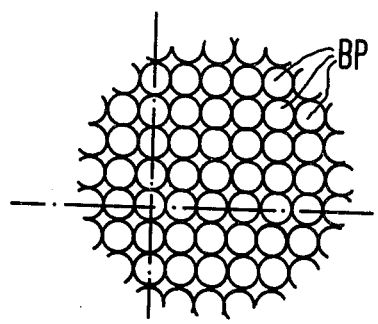
FIG. 3a is an illustration of a grid position having two lines of orientation.
Figure 3B:
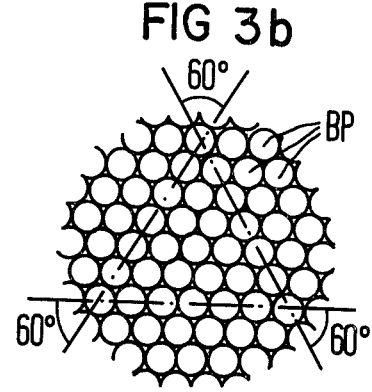
FIG. 3b is an illustration of a grid position having three lines of orientation.

FIG. 3 illustrates possible arrangements of the image dots BP in different grid patterns. In the arrangement a, the grid positions of a known grid are illustrated. In this grid, the image dots BP are disposed oriented in two directions along horizontal and vertical lines. With this grid pattern it is impossible to cover the area with color completely when image dots BP appear in all the grid positions and just touch one another.

The grid pattern according to the present invention is illustrated at b and exhibits three directions of orientation for the grid positions. The image dots BP lie most densely packed following the honeycomb principle at the corners of equilateral triangles. When the image dots BP are the same size, as in the grid b, this principle produces much better coverage with color.

Figure 4:
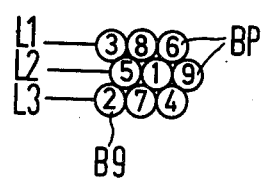
FIG. 4 shows an image patch composed of nine image dots.

Referring to FIG. 4, an image patch B9 is illustrated which is formed of nine image dots BP and can be seen as an extract from the grid b of FIG. 3. The numbering of the image dots BP indicates the order in which the individual grid positions in the image patch B9 are filled when producing different grey steps in order to obtain the possible n (0–9) grey steps. In the zero grey step there are zero image dots BP per image patch B9. This grey step is white. In the first grey step there is one image dot BP per image patch B9, this being produced at the image dot 1. In the second grey step, each image patch B9 contains the first and the second image dots, that is the image dots 1 and 2. In the ninth grey step (black) all of the grid positions in each image patch B9 are filled with image dots BP.

Figure 5:
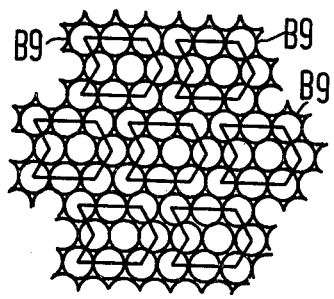
FIG. 5 illustrates a plurality of image patches disposed in lines.

In the illustration of grid positions in FIG. 5, the image patches B9 are grouped together again so as to follow the principle of the three directions of orientation. A ten-step grey wedge produced in this manner having grey steps G0–G9 is illustrated at a of FIG. 6.

Figure 6:
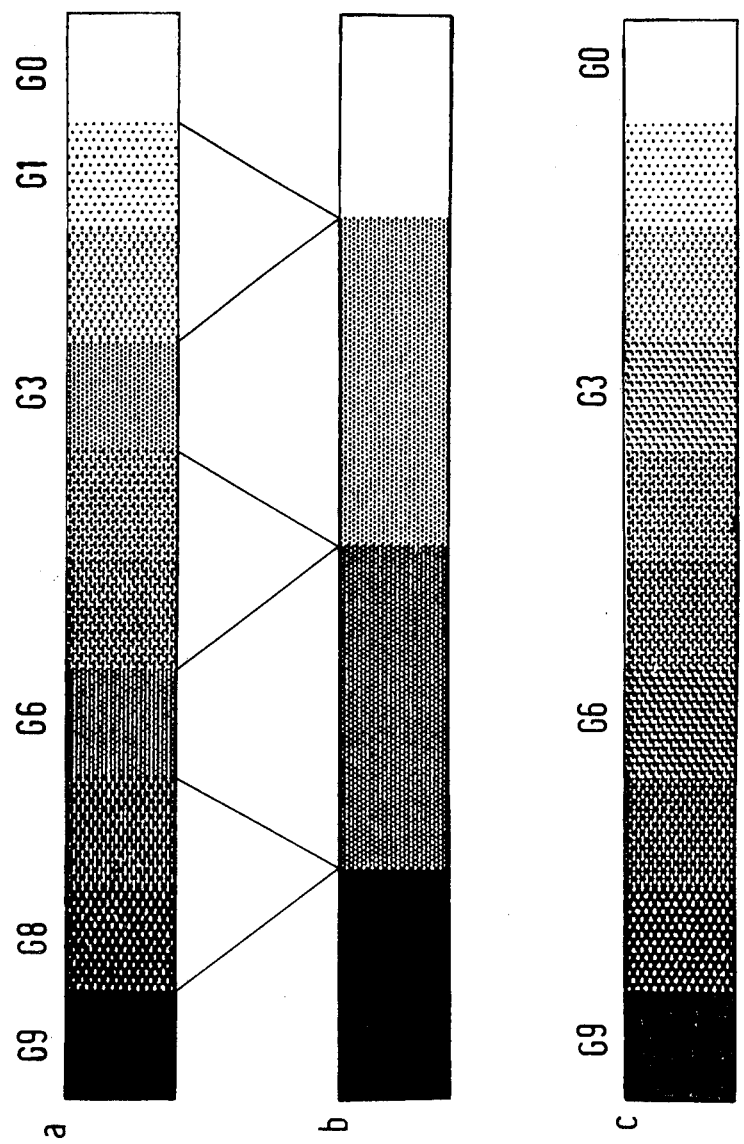
FIG. 6 shows a plurality of grey wedges.

In the illustration of the grey wedge in FIG. 6 it is striking that the grey steps G0 (white), G3, G6 and G9 (black) have a particularly uniform dot distribution. If these four grey steps, which are equidistant from one another in the grey wedge, are sufficient, it is possible to produce a very even grey wedge, such as illustrated at b of FIG. 6. This grey wedge can also be reduced to an image patch B3 having three image dots in which case the image dots are located at the corners of an equilateral triangle.

If it is desired to improve even further the ten-step grey wedge shown at a of FIG. 6, it is advisable to use artificial means to impair the particularly good grey steps G3 and G6 which blur too quickly for the eye and thus drop out of the overall impression. This can be achieved particularly simply by substituting series three and four and series six and seven in filling the image patch B9 with the image dots BP. The result is a uniform grey wedge in which all the grey steps blur before the eyes at about the same distance. This grey wedge is illustrated at c of FIG. 6.

Figure 7:
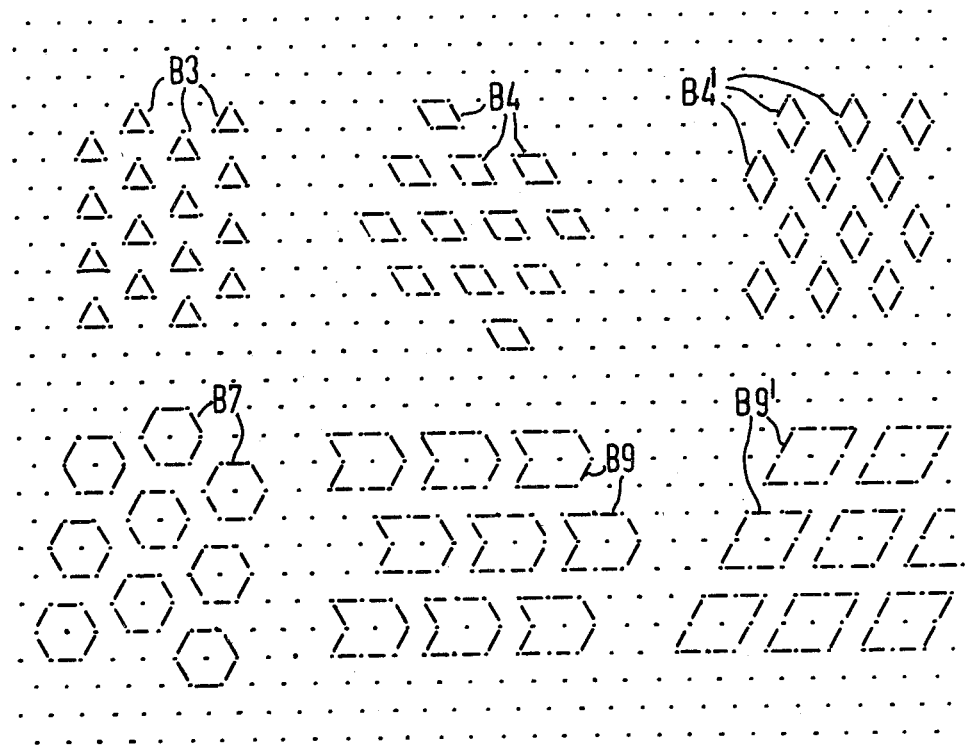
FIG. 7 illustrates grid positions with image patches composed of three, four, seven and nine image dots.

In FIG. 7, the mid-points of possible image dots BP are indicated for a larger area. These mid-points represent the grid positions and are located with the three relative directions of orientation set forth above. It can be seen that in this area a different number of n image dots can be combined in patterns permitting the area to be built up from the image patches named above. The image patches B3 are formed in each case using three directly adjacent grid positions. They are arranged in columns and the image patches of the neighboring columns are in each case disposed offset by one line. A grey wedge formed of these image patches matches the grey wedge illustrated at b of FIG. 6. In each case the image patches marked B4 and B4' are made of four grid positions arranged to form diamond shapes. A five-step grey wedge can be made using these image patches. The image patches B7 are each formed of seven directly adjacent grid positions. An eight-step grey wedge can be produced using the image patches B7.

The image patches marked B9 match the image patches illustrated in FIG. 4 and FIG. 5 and can be used to reproduce the grey wedges illustrated at a and c of FIG. 6. The image patches B9 are arranged in lines, each line of patches consisting of three grid lines. The image patches of neighboring lines are disposed offset by 1.5 image dot divisions. Another possibility for combining nine grid positions is to form image patches as shown with the image patches B9'.

A large number of other image patches can be produced in addition to the image patches illustrated, the essence of the image patches being that one particular image dot in an image patch is always the same distance from the corresponding image dot in the six directly adjacent image patches. The corresponding image dots of directly adjacent image patches therefore form the corners of a hexagon at the mid-point of which the particular image dot of an image patch is located.

When establishing other sizes of an image patch it is assumed that any number of equilateral hexagons can be arranged in a grid with three lines of orientation at 60° as illustrated in FIG. 7. As the hexagons increase in size, the result is also larger image patches. The number n of image dots in an image patch can be determined by the following equation:

$$n = (a + k \cdot 0.5)^2 + 3 \cdot (b + k \cdot 0.5)^2$$

where k can have the values 0 or 1, and the values a and b can have the values 0, 1, 2 . . . .

An essential basic rule when filling an image patch with image dots is that a preset order must be strictly maintained. For example, the image dots 1 of the first grey step G1 must also be located exactly in the position assigned thereto in the higher grey steps, i.e. only additional image dots must be used for higher steps. The image patches should not be redistributed arbitrarily for a particular grey step. The reason for this rule is that the boundary between two grey steps should also run transversely through an image patch to increase resolution. If the rule is observed, the transition from one grey step to another is clear. Otherwise, it might be possible to have accumulations or shortages of image dots at the boundary. To depict an outline more clearly, it may also be advantageous with truncated image patches if the remaining image dots are arranged in the same manner as in complete image patches and if the image dots lying outside of the outline are omitted.

When using image patches B9 formed of nine image dots BP, for example, the image patches of four lines are printed simultaneously with the aid of the ink printing head illustrated in FIGS. 1 and 2 which can print the image dots in twelve lines at once. When image patches having a different number of image dots are used, a corresponding number of image patches or portions thereof are printed in a similar manner in one movement of the printing head.

In place of the ink printing head, use can also be made of a needle printing head known per se in which the printing elements are constituted by printer needles that are pressed against the recording carrier with the aid of magnets. It is also conceivable to depict half-tone images by the indicated method using other printing heads known from matrix printers and working, for example, with electrosensitive or heat sensitive paper. It is also possible to produce half-tone images by this method with the aid of display components such as liquid crystal or plasma display elements, for example.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method of depicting a half-tone image in which the image is formed in grey steps extending between black and white and in which the image is generated from equisized image dots disposed in predetermined grid positions and of a number per unit area which determines the specific grey step, the improvement comprising the step of:
    forming the image dots in grid positions which include three lines of orientation in which each grid position is surrounded by six directly adjacent grid positions and is equidistant from such grid positions.

2. The improved method of claim 1, wherein the step of forming is further defined as:
    directing image dot of a predetermined grey step equidistant from the corresponding dot in the six adjacent image patches.

3. The improved method of claim 2, wherein the step of forming is further defined as:
    defining a predetermined number of neighboring grid positions to form an image patch and filling the image patches with a number of image dots corresponding to the specific grey step.

4. The improved method of claim 3, wherein the step of forming is further defined as:
    forming an image patch by producing seven directly adjacent grid positions.

5. The improved method of claim 4, wherein: for truncated image patches, providing remaining image data resulting from truncation in the same manner as with complete image patches.

6. The improved method of claim 3, comprising the step of:
    combining the image patches such that all of the image dots are disposed with three directions of orientation.

7. The improved method of claim 6, comprising the step of:
    for nine adjacent grid positions forming an image patch, generating the image patches in lines with adjacent lines positioned offset by 1.5 image dot divisions.

8. The improved method of claim 6, comprising the step of:
    generating, for three adjacent grid positions forming an image patch, image patches in columns with neighboring columns offset by one line.

* * * * *